United States Patent [19]

Wirz

[11] Patent Number: 4,974,754
[45] Date of Patent: Dec. 4, 1990

[54] METERING APPARATUS FOR METERING AND DELIVERING FLUID OR PASTY SUBSTANCES AND USE OF SAID METERING APPARATUS

[75] Inventor: Gustav Wirz, Berg, Switzerland
[73] Assignee: Alphasem AG, Berg, Switzerland
[21] Appl. No.: 264,338
[22] Filed: Oct. 31, 1988

[30] Foreign Application Priority Data

Nov. 30, 1987 [CH] Switzerland ............... 4661/87

[51] Int. Cl.⁵ .............................................. B65D 37/00
[52] U.S. Cl. ............................. 222/207; 222/209;
   222/214; 222/309; 222/334; 222/440; 222/447;
   222/450; 222/504; 417/413; 417/479; 417/518
[58] Field of Search ........... 222/207, 209, 214, 309,
   222/383, 434, 440, 447, 450, 333, 334, 504;
   417/413, 442, 457, 478, 479, 496, 474, 480, 518

[56] References Cited

U.S. PATENT DOCUMENTS

| | | | |
|---|---|---|---|
| 4,030,640 | 6/1977 | Citrin et al. | 222/209 X |
| 4,095,722 | 6/1978 | Miller | 222/207 X |
| 4,121,584 | 10/1978 | Turner et al. | 222/207 X |
| 4,199,307 | 4/1980 | Jassawalla | 417/478 X |
| 4,305,702 | 12/1981 | Hartley | 417/413 |

*Primary Examiner*—Andres Kashnikow
*Assistant Examiner*—Gregory L. Hason
*Attorney, Agent, or Firm*—William R. Hinds

[57] ABSTRACT

A metering apparatus has a metering chamber which has at least one boundary surface in the form of a flexible diaphragm. The diaphragm is operatively connected to an actuating device so that the volume of the chamber for metering and delivering the substance can be varied. An inlet opening and an outlet opening in the metering chamber can preferably be closed off directly by the diaphragm, more specifically by means of closure devices arranged in the region of those openings. The metering apparatus is particularly suitable for die bonders for the delivery of a bonding agent onto a substrate which is then equipped with electronic components.

13 Claims, 4 Drawing Sheets

METERING APPARATUS FOR METERING AND DELIVERING FLUID OR PASTY SUBSTANCES AND USE OF SAID METERING APPARATUS

FIELD OF THE INVENTION

The invention relates to a metering apparatus for metering and delivering fluid substances, such substances being regarded as including pasty substances.

Such apparatuses are for the most part to be used for delivering or applying very small amounts of fluids or pastes such as for example lubricants, frits, dyes, adhesives etc. The apparatuses are for the most part also a component of an automatic working machine so that delivery must occur at regular intervals of time, at the rhythm of the machine.

DESCRIPTION OF THE PRIOR ART

Metering apparatuses are already known for example in which the substance is introduced into a cylindrical cartridge which at one end has a delivery tip with a capillary tube. The supply cartridge is connected by way of a hose to a compressed air system which applies to the cartridge pressure surges which are metered by means of a control device. The desired amount of substance thus issues from the capillary tubes at any desired intervals of time. It is also possible to use microlitre syringes with pistons which can be driven by motor means, in a similar fashion.

However a disadvantage of the known apparatuses is that they can only be cleaned with difficulty or cannot be cleaned at all so that the essential components are generally in the form of wearing components, to be discarded. When dealing with substances which have a very intensive abrasion effect, as for example the silver glass paste which is used in the electronics industry for sticking components, wear phenomena and disorders in operation generally occur after just a short period of time. In addition known apparatuses generally have only a limited storage capacity so that the operating process has to be interrupted for reloading or refilling the machine. Finally, a sufficient level of precision in the metering operation is not always guaranteed as too many components affect the metering action at the point of discharge.

SUMMARY OF THE INVENTION

Therefore an object of the invention is to provide a metering apparatus of the kind set forth in the opening part of this specification, with which even fluids which have an intensive abrasion effect and/or which are very viscous can be metered with a high level of precision and in a fully automatic procedure over a prolonged period of time. The apparatus is to be quick and easy to clean and is to have only a minimum of replaceable wearing components.

In accordance with the invention that object is attained with a metering apparatus for a fluid substance comprising a chamber body formed with a cavity, a flexible diaphragm, means securing said diaphragm to said chamber body so as to cover said cavity, forming therewith a metering chamber, said chamber body being formed with inlet and outlet openings positioned respectively for the delivery to and discharge from said metering chamber of fluid, and at least one actuating means operatively connected to said diaphragm for varying the volume of said metering chamber.

The metering chamber with the flexible diaphragm virtually forms a pump as the chamber volume can be increased or reduced by way of the actuating means. In that connection the metering chamber can be of as small dimensions as possible so that the compressibility of the substance has the minimum possible influence on the metering operation. A relatively large storage container for the substances can be connected to the metering chamber. In addition the metering chamber may be disposed very close to the point of discharge or the point of application for the substance. A single diaphragm is generally sufficient. It would also be possible however for the metering chamber to have two parallel diaphragms as boundary surfaces, and for each diaphragm to have its own actuating means.

The actuating means is preferably a pressure fluid cylinder, in particular a pneumatic cylinder, the piston of which acts directly or indirectly on the diaphragm. The diaphragm can be pressed towards the interior of the metering chamber by means of the piston so that the volume of the chamber is reduced. Pneumatic cylinders are relatively simple to control, they operate without danger even under difficult conditions of use, and they do not require expensive sealing and conduit systems. It will be appreciated however that the actuating means could also be an electromagnetic drive arrangement, a motor-driven lever system or the like.

A particularly rational and fault-free mode of operation of the metering apparatus can be achieved if the inlet opening and the outlet opening is closable by pressing the diaphragm thereagainst, with a respective closure device arranged in the region of said openings outside the diaphragm. In that way the diaphragm also has a valve function by closing off the openings in the boundary surface of the metering chamber. It will be appreciated however that those openings could also be closed and opened respectively by other shut-off means. The closure devices are preferably also pressure fluid cylinders, whose pistons act directly or indirectly on the diaphragm. Pneumatic cylinders are also used in this case, for the above-mentioned reasons.

Particularly easy cleaning of the apparatus can be achieved if the metering chamber is in the form of a shallow flat depression in a substantially prismatic chamber body and if the diaphragm is laid over the depression onto the chamber body. In that arrangement the chamber body may have an inlet connection and an outlet connection which are communicated with the metering chamber by means of bores which open into the bottom of the depression where they form the inlet opening and the outlet opening respectively. In that way the chamber body forms a component which is only provided with bores or ducts. In order to provide free access to the metering chamber or the above-mentioned bores, it is only necessary for the diaphragm to be lifted off. The diaphragm can thus be in the form of a cheap wearing component which can be replaced when required. The diaphragm is preferably made from plastics material, for example silicone. That ensures a high degree of flexibility in the region of the actuating means and a good sealing effect in the region of the closure devices.

The diaphragm can be replaced and the chamber body cleaned in a particularly simple manner if the chamber body can be pressed with a clamping device against an intermediate plate in such a way that the diaphragm is held fast over the depression, and the intermediate plate has openings for the closure devices and for the actuating means. In that way the chamber body, with the diaphragm, can be quickly removed by simply releasing the clamping device, without additional dismantling operations being required. The diaphragm is not fixedly connected to any component but is only clamped in position between the chamber body and the intermediate plate.

The piston stroke movement of the pressure fluid cylinder serving as the actuating means can be adjustable by an adjusting means. In that way the amount to be metered may be quickly altered or corrected at any time. The adjusting means may comprise an adjusting screw which acts on the piston or the piston rod. It may also be for example in the form of a built-in micrometer with a vernier for accurate setting. However it would also be advantageous to use an electric adjusting motor with a spindle which acts on the piston or on the piston rod. The adjusting operation could be substantially automated by means of the electric motor by for example various settings being stored in a data memory, which settings can be selectively fed to the adjusting motor as control signals.

The invention is also concerned with the use of the described metering apparatus on an automatic die bonder for fixing electronic components, in particular chips, on a substrate, for metering a bonding agent on the substrate. In the case of die bonders, the bonding agent used is generally an epoxy resin, a solder paste or a silver glass paste, which are extremely difficult to handle in automatic apparatuses. That applies in particular to silver glass paste. However, die bonders involve extremely high levels of requirement in respect of speed and precision so that use of the specified metering apparatus has proved to be particularly advantageous. The stoppage times of the installation can be reduced to a minimum and, with the exception of the easily replaceable diaphragm, no wear phenomena occur.

DESCRIPTION OF THE DRAWINGS

Further advantages and individual features of the invention are to be found in the following description and the drawings in which.

DESCRIPTION OF A PREFERRED EMBODIMENT

Figure 1:
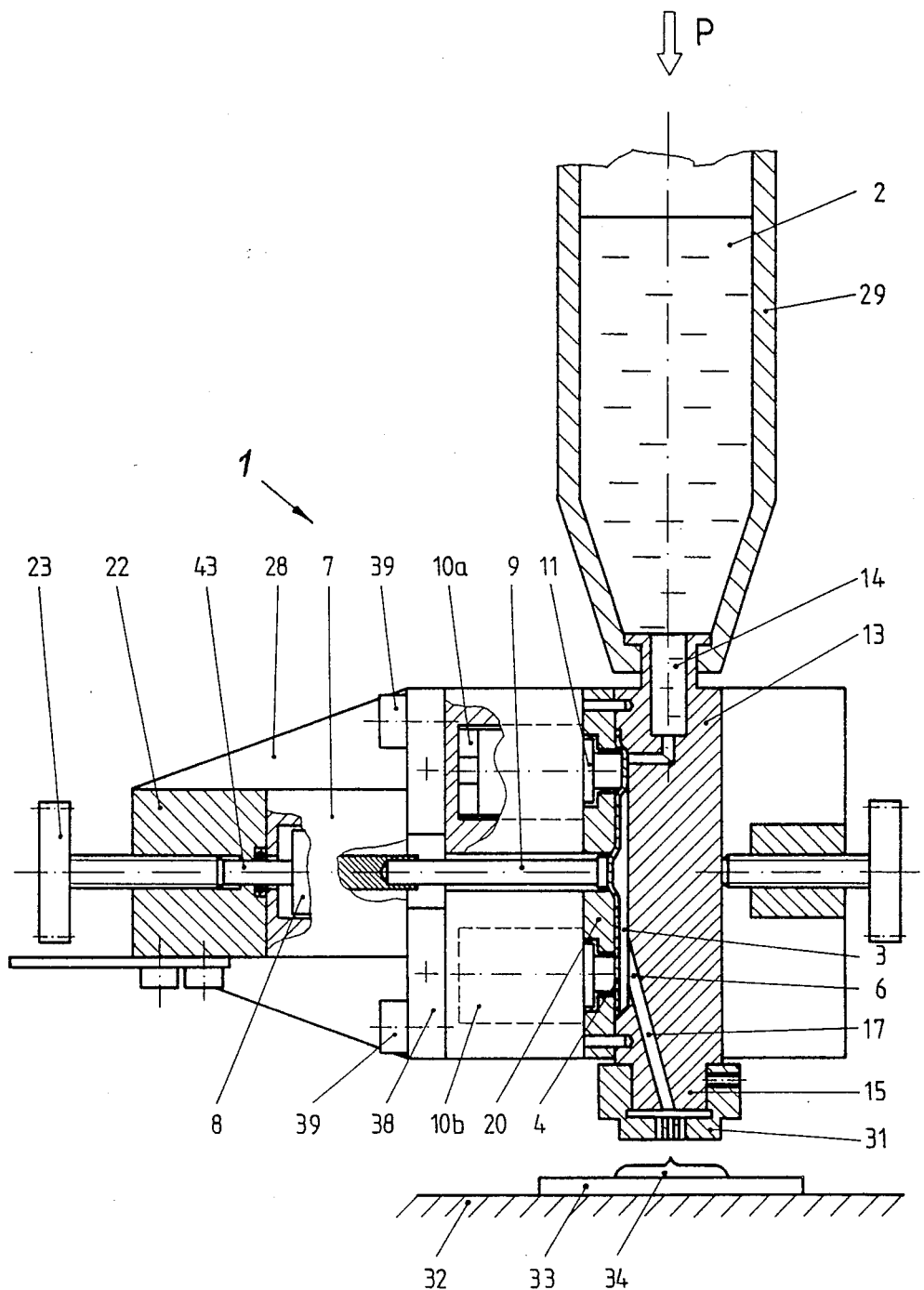
FIG. 1 is a view in cross-section through an apparatus constructed according to the invention.
Figure 2:
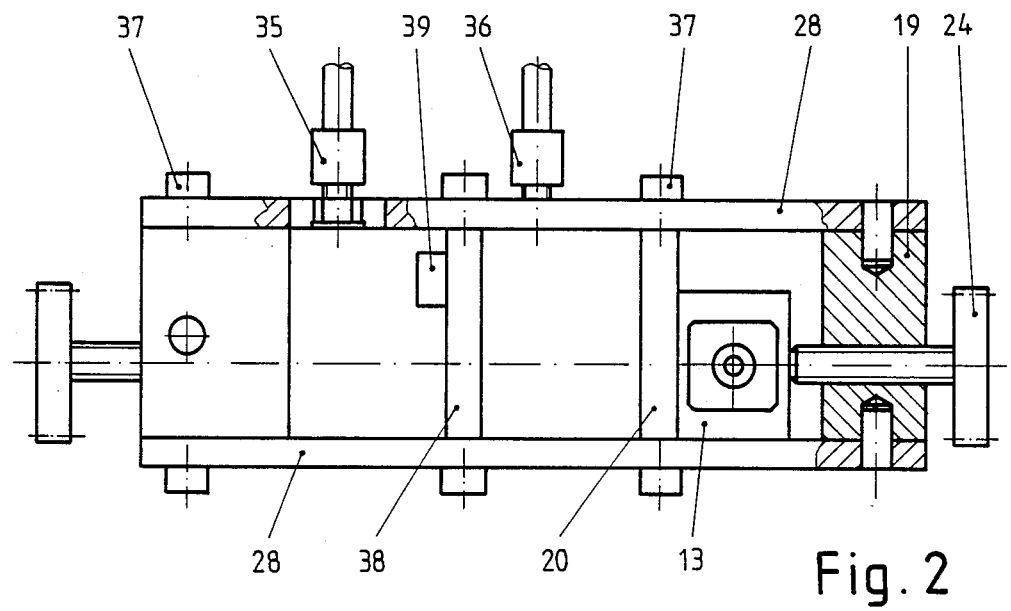
FIG. 2 is a plan view of the apparatus shown in FIG. 1.
Figures 5, 6:
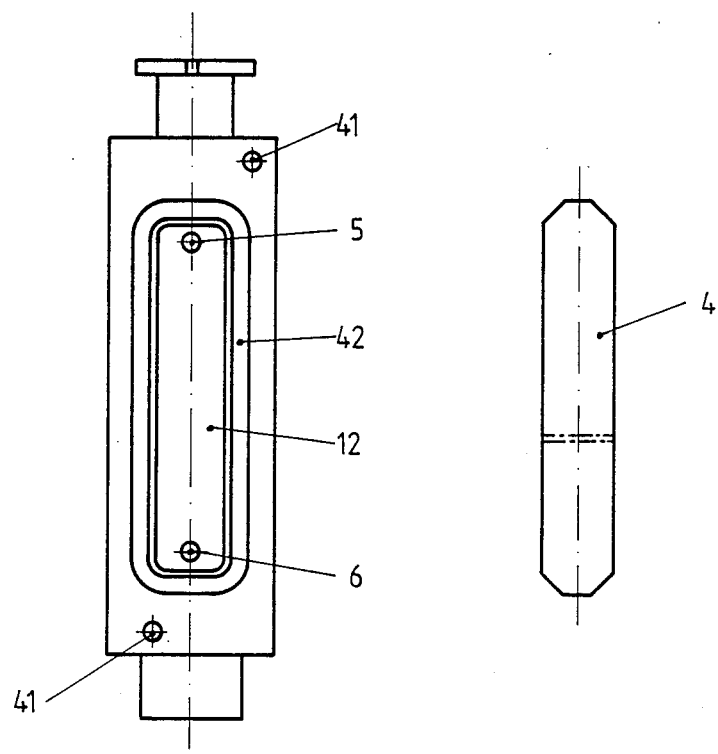
FIG. 5 is a plan view of the chamber body showing a depression therein.
FIG. 6 is a plan view of a diaphragm.

As shown in particular in FIGS. 1 and 2 but in part also in the other Figures, the metering apparatus 1 essentially comprises a substantially prismatic chamber body 13 in which a shallow flat depression 12 (FIG. 5) is disposed on one side. Lying over the depression 12 is a flexible diaphragm 4, thus forming a metering chamber 3 whose volume can be varied by means of the diaphragm 4.

The metering chamber 3 has an inlet opening 5 (FIG. 4a) and an outlet opening 6 in the bottom 18 of the depression 12. The chamber body 13 also has an inlet connection 14 and an outlet connection 15. A bore 16 (FIG. 4a) extends from the inlet connection 14 to the inlet opening 5 and a bore 17 extends from the outlet connection 15 to the outlet opening 6. In the embodiment shown in FIG. 1, connected to the inlet connection 14 is a storage container 29 which contains a store of a liquid substance 2, for example a silver glass paste. The substance 2 is subjected to a pressure P for example by means of gas pressure. Instead of the container 29 however it would also be possible for a hose or conduit for carrying the substance to be connected to the inlet connection 14.

The outlet connection 15 is provided with a quick-change distributor head 31 for distributing the substance to be delivered. A substrate or workpiece 33 which is disposed on a working table 32 can thus be provided with a bonding agent drop 34 of a given configuration. Instead of the distributor head 31 however it would also be possible for a nozzle, a capillary tube or the like to be fixed to the outlet connection 15.

The chamber body 13 with the diaphragm 4 laid thereon is pressed against an intermediate plate 20 by means of a clamping device 19 in such a way that the diaphragm is held fast in position thereby. The clamping device 19 is a block of material with a screwthreaded bore into which a clamping screw 24 is screwed. Two cylindrical pins 25 (FIG. 4a) in the intermediate plate 20 serve as positioning elements for the chamber body 13. As can be seen in particular from FIG. 5, the bores 41 for accommodating the cylindrical pins or the cylindrical pins themselves are arranged in displaced relationship on both sides of the depression 12. A receiving groove 42 which extends around the depression 12 is of a depth which approximately corresponds to the thickness of the diaphragm 4. In that way the diaphragm 4 can be disposed in a defined position over the depression 12 and the outside thereof also extends substantially flush with the outside of the chamber body.

Arranged in the region of the openings 5 and 6, outside the diaphragm 4, are closure devices 10a and 10b in the form of short-stroke cylinder units with pistons 11a and 11b. An actuating means 7 is disposed between the two closure devices 10a and 10b, also being in the form of a pneumatic short-stroke cylinder with its piston 8. Provided in the intermediate plate 20 are openings 21 through which the closure devices and the actuating means can act on the diaphragm 4. The piston 8 is connected to a thrust member 9, by means of which the diaphragm 4 can be engaged, to vary the volume of the chamber. The two pistons 11a and 11b can press the diaphragm 4 against the inlet opening 5 and against the outlet opening 6 respectively.

The piston 8 of the actuating means 7 is also connected to a piston rod 43 which projects into an adjusting means 22. The adjusting means also comprises a block of material with a screwthreaded bore into which an adjusting screw 23 can be screwed. The stroke movement of the piston rod 43 and therewith that of the thrust member 9 can be limited or adjusted by means of the adjusting screw 23. The adjusting screw 23 is actuated manually. In place thereof however it is also possible to use an adjusting spindle which is actuated by an electric motor.

The two closure devices 10a and 10b are disposed in a cylinder block 40 which is fixed by means of screws 39 to a holding plate 38. As can be seen from FIG. 2, the individual components, in particular the clamping device 19, the intermediate plate 20, the holding plate 38 and the adjusting means 22, are held together by parallel clamping plates 28 and 28', more specifically by means of fixing screws 37 which are screwed through the two clamping plates. FIG. 2 also shows the hose connection 35 for the pneumatic actuating means 7 and the hose connections 36, which are disposed one behind the other, for the two pneumatic closure devices 10a and 10b.

Figure 3:
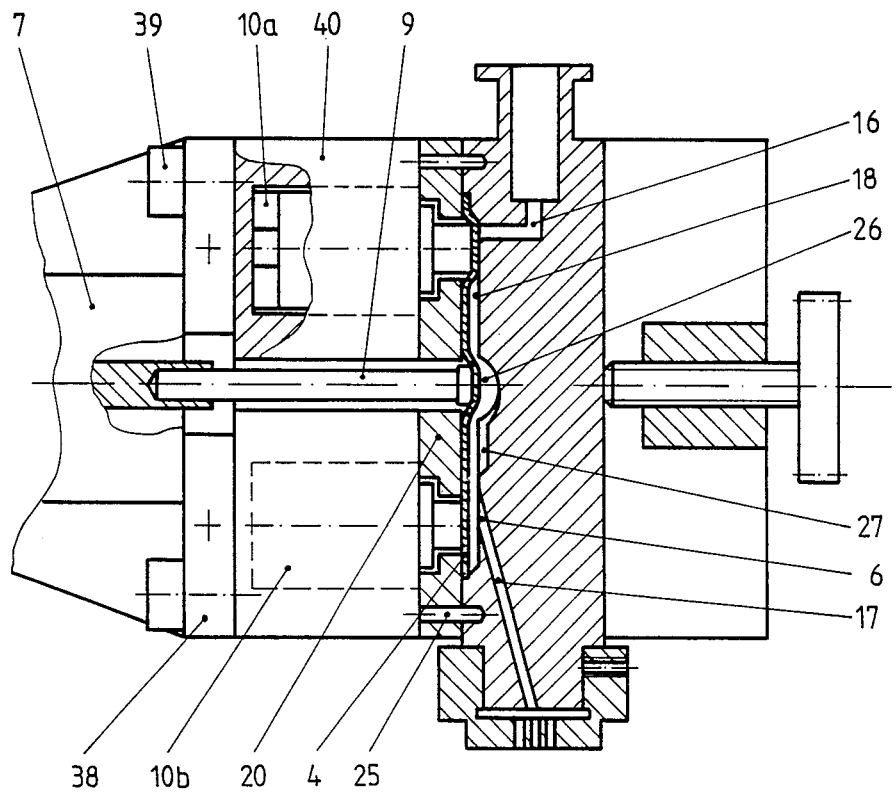
FIG. 3 is a view in cross-section through a somewhat modified embodiment.

The embodiment shown in FIG. 3 is identical in its essential structure to the embodiment illustrated in FIGS. 1 and 2. However, a substantially concave hollow 26 is additionally provided in the bottom 18 of the depression 12. The thrust member 9 which can be pressed against the diaphragm 4 has a correspondingly convex end so that the metering chamber can be completely cleared out in the region of the hollow 26. A duct 27 leads from the deepest part 26 to the metering chamber 3, more specifically on the outlet side. When the hollow 26 is cleared out the substance therefore passes by way of the duct 27 directly towards the outlet bore 17. Both the duct 27 and also the outlet bore 17 can on the other hand be closed by the closure device 10b.

Figure 4:
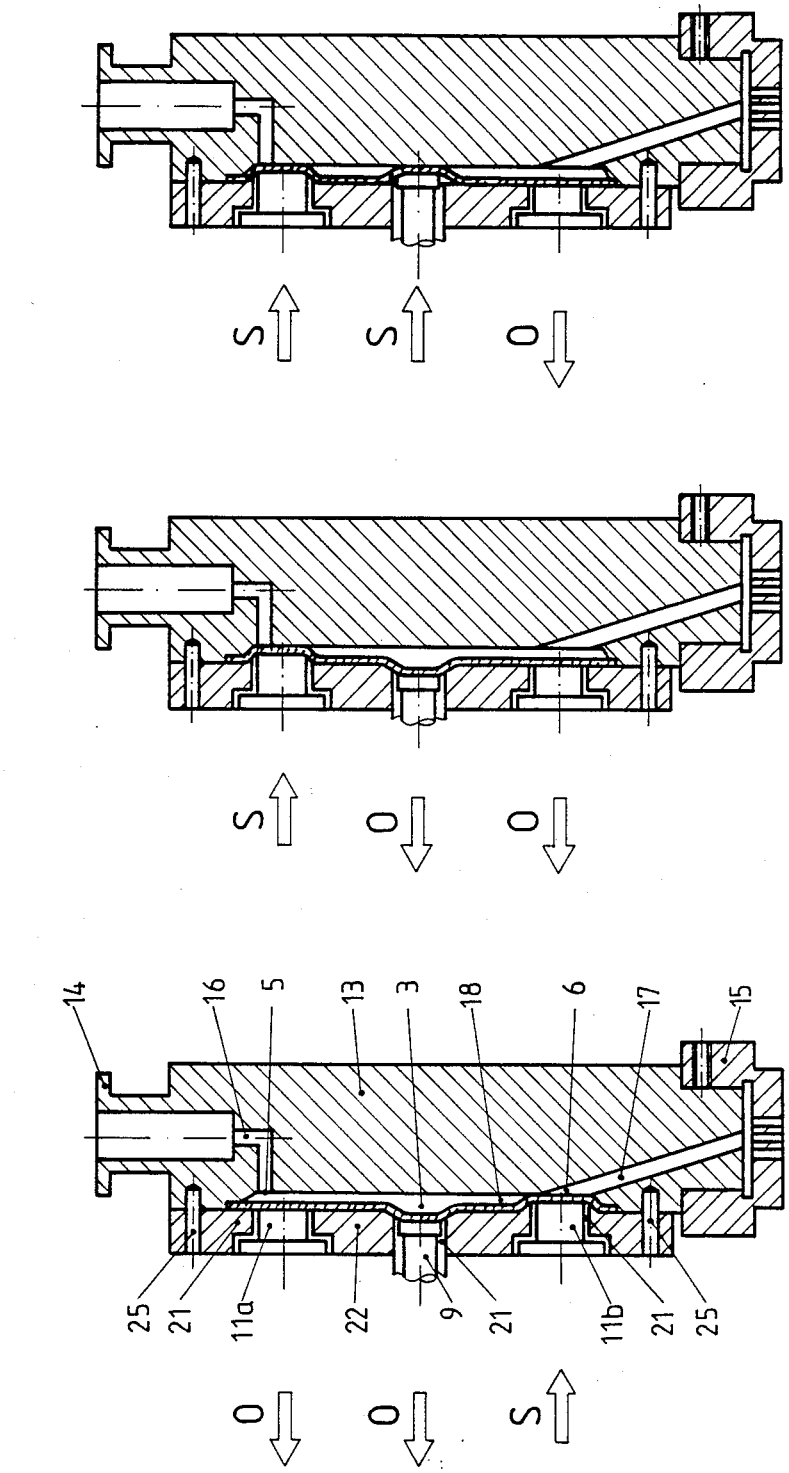
FIG. 4 is a view in cross-section through a chamber body in three different individual sequences of metering operation (a, b, and c)

Operation of the metering apparatus according to the invention is shown in three sequences, with references to FIG. 4. In the starting position as shown in FIG. 4a, the metering chamber 3 is filled by the piston 11a being in the open position 0 so that the diaphragm 4 opens the inlet opening 5. In contrast the piston 11b is in the closed position S so that the outlet opening 6 is closed by the diaphragm 4. The thrust member 9 is also in the open position 0, more particularly with the stroke movement permitted by the above-mentioned adjusting means. As the substance which is supplied by way of the inlet connection 14 is under pressure, the diaphragm 4 is pressed under that pressure against the piston 11a or against the thrust member 9. In that operating position the associated pneumatic cylinders are relieved of load while the pneumatic cylinder associated with the piston 11b is under pressure.

After the metering chamber 3 has been filled with the substance in that way, the piston 11a is moved into the closed position S so that the inlet opening 5 is in turn closed. That operating position is shown in FIG. 4b. At the same time or with some delay, the piston 11b may be moved into the open position 0 so that the outlet opening 6 is opened. In that case, the thrust member 9 is still in the open position.

Then, as shown in FIG. 4c, the trust member 9 is moved into the closed position S so that the volume of the metering chamber 3 is in turn reduced and the substance contained therein is urged by way of the outlet opening 6 into the outlet bore 17 and from there onto the workpiece or substrate 33. Sequential control of the individual pneumatic cylinder units is known per se to the man skilled in the art and is therefore not described in greater detail herein. In that way very small amounts of the substance may be metered and delivered in quick succession. For the purposes of cleaning the apparatus, it is only necessary to release the clamping screw 24 so that the chamber body 13 can be lifted off the intermediate plate 20 and removed. The cleaning operation may be effected for example by means of solvents and/or compressed air.

The illustrated embodiments are shown on a scale of magnification of about 1.8 to 2. The thickness of the silicone diaphragm is about 1 mm and the depth of the depression 12 is only about 0.3 mm. Different amounts may be metered, depending on the diameter and stroke movements of the thrust member 9. It will be appreciated that the dimensions could be altered without thereby departing from the concept of the invention. It would also be possible for the volume of the metering chamber 3 to be larger so that a plurality of individual metering operations can be effected with one filling of the chamber by sequential actuation of the thrust member 9.

I claim:

1. A metering apparatus for a pasty or fluid substance comprising a chamber body formed with a cavity which opens to an exterior surface of the chamber body, the opening of said cavity being covered with an intermediate plate which is held in contact with the chamber body, a flexible diaphragm secured between said plate and said cavity, whereby the diaphragm and the cavity define a metering chamber, said chamber body being formed with inlet and outlet openings positioned respectively for the delivery to and the discharge from said metering chamber of a fluid or pasty substance, closure devices for selectively opening and closing said openings, a movable thrust member, said plate being formed with an opening through which said thrust member is movable in directions toward and away from the diaphragm so as to vary the volume of said metering chamber and such that the diaphragm will be flexibly pressed under an internal pressure in the metering chamber against the plate and the thrust member to determine the volume of the metering chamber and whereby the volume of the metering chamber is variable by movement of said thrust member.

2. A metering apparatus according to claim 1, in which said diaphragm is made of a plastics material.

3. A metering apparatus according to claim 1 further comprising a distributing head removably attached to said chamber body and including a distributing outlet opening, said outlet opening from said metering chamber being directly connected to said distributing head and distributing outlet opening by a linear bore such that the metering chamber is arranged immediately in the region of the distributing outlet opening to minimize drying of the substance between the metering chamber and the distributing outlet opening and to facilitate cleaning of the apparatus.

4. A metering apparatus according to claim 1, further comprising actuating means for moving said thrust member, in which said actuating means comprise a cylinder body, a piston reciprocable in said cylinder body, means for admitting pressure fluid to one end of said piston, and means connecting said piston to said thrust member.

5. A metering apparatus according to claim 4 including an adjusting means for adjusting the stroke movement of said piston.

6. A metering apparatus according to claim 5, in which said adjusting means comprises an adjusting screw for limiting a movement of said piston.

7. A metering apparatus according to claim 1, in which said cavity is in the form of a shallow flat depression and said chamber body is a substantially prismatic body.

8. A metering apparatus according to claim 7, in which said chamber body is formed with a concave hollow at the bottom of said depression, and with a passage leading from the lowest point of said hollow to said metering chamber and in which said thrust member is formed with a convex end mounted and shaped to be pressed into said concave hollow.

9. A metering apparatus according to claim 7, in which said inlet and outlet openings are located in the bottom of said flat depression and the apparatus includes inlet and outlet connections, the chamber body being formed with bores connecting said inlet and outlet connections respectively to said inlet and outlet openings.

10. A metering apparatus according to claim 1, wherein said closure devices are respectively mounted in the regions of said inlet and outlet openings but outside said metering chamber for pressing said diaphragm selectively against said inlet and outlet openings.

11. A metering apparatus according to claim 10, in which each said closure device comprises a cylinder body, a piston reciprocable in said body, means for admitting pressure fluid to one end of said piston and mechanical means for transmitting pressure from the other end of said piston to said diaphragm.

12. A metering apparatus according to claim 1, including a clamping device by which said chamber body is held pressed against said intermediate plate thereby holding said diaphragm fast over said cavity, said intermediate plate being formed with openings providing access for said closure devices to said diaphragm.

13. A metering apparatus according to claim 12, including at least two positioning elements for positioning said chamber body on said intermediate plate, said clamping device comprising a clamping screw for maintaining said chamber body in engagement with said intermediate plate and said positioning elements.

* * * * *